United States Patent
Marcelino

(10) Patent No.: US 8,313,689 B2
(45) Date of Patent: Nov. 20, 2012

(54) FILTER FOR USE IN THE CASTING OF ALUMINIUM, MAGNESIUM, COPPER ALLOY AND THE LIKE

(75) Inventor: Emile Marcelino, Le Calais (FR)

(73) Assignee: Saint Jean Industries (FR)

( * ) Notice: Subject to any disclaimer, the term of this patent is extended or adjusted under 35 U.S.C. 154(b) by 0 days.

(21) Appl. No.: 12/896,504

(22) Filed: Oct. 1, 2010

(65) Prior Publication Data

US 2011/0042030 A1    Feb. 24, 2011

Related U.S. Application Data

(63) Continuation of application No. PCT/FR2009/050237, filed on Feb. 16, 2009.

(30) Foreign Application Priority Data

Apr. 1, 2008  (FR) .................................. 08 52147

(51) Int. Cl.
*C21B 7/12* (2006.01)
(52) U.S. Cl. ......................................... 266/45; 266/230
(58) Field of Classification Search .................. 266/227, 266/230, 44, 45
See application file for complete search history.

(56) References Cited

U.S. PATENT DOCUMENTS 4,295,868 A    10/1981  Hölter et al.

FOREIGN PATENT DOCUMENTS

| | | | |
|---|---|---|---|
| FR | 2021462 | A1 | 7/1970 |
| FR | 2379493 | A * | 10/1978 |
| FR | 2419750 | A1 | 10/1979 |
| FR | 2647381 | A * | 11/1990 |
| GB | 1192583 | | 7/1967 |
| GB | 1228298 | | 4/1971 |
| GB | 2420601 | A | 5/2006 |
| JP | 63052742 | A | 3/1988 |
| JP | 63224837 | A | 9/1988 |
| JP | 1143739 | A | 6/1989 |

OTHER PUBLICATIONS

International Search Report; PCT/FR2009/050237; Aug. 18, 2009; 3 pages.

* cited by examiner

*Primary Examiner* — Scott Kastler
(74) *Attorney, Agent, or Firm* — St. Onge Steward Johnston & Reens LLC

(57) ABSTRACT

The filter of the type made out of fiberglass fabric is remarkable in that it includes an impregnation in an iron oxide enriched resin which confers a magnetization-based function and property upon it and allows the feeder head/filter unit to be recycled so that the metal and the waste filters can be recovered.

10 Claims, 2 Drawing Sheets

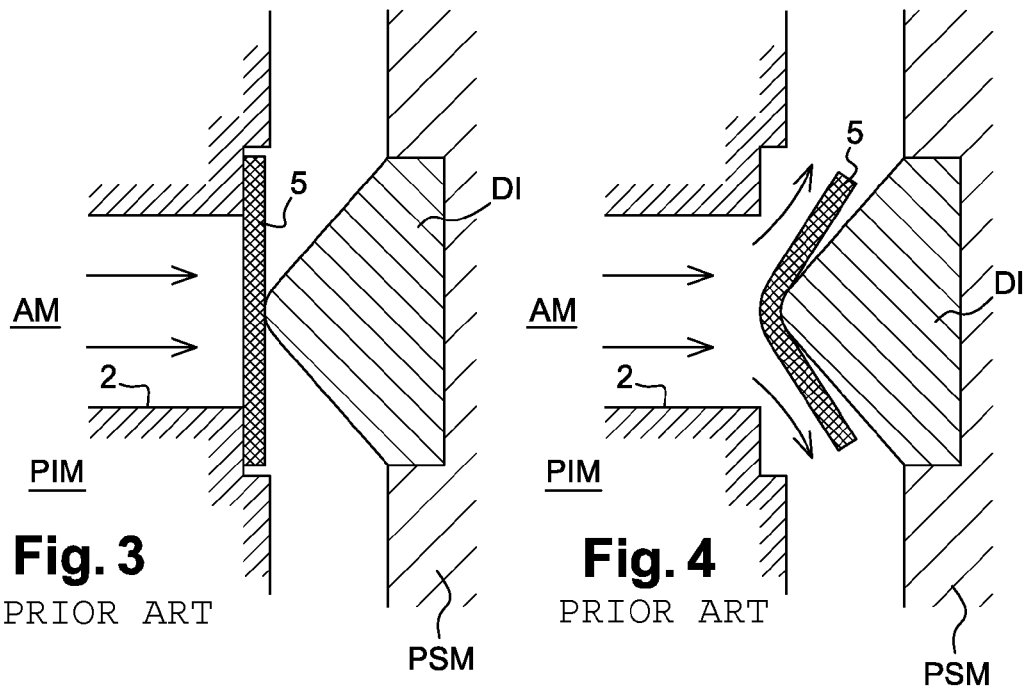
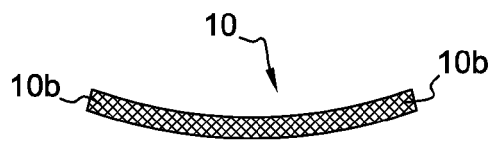
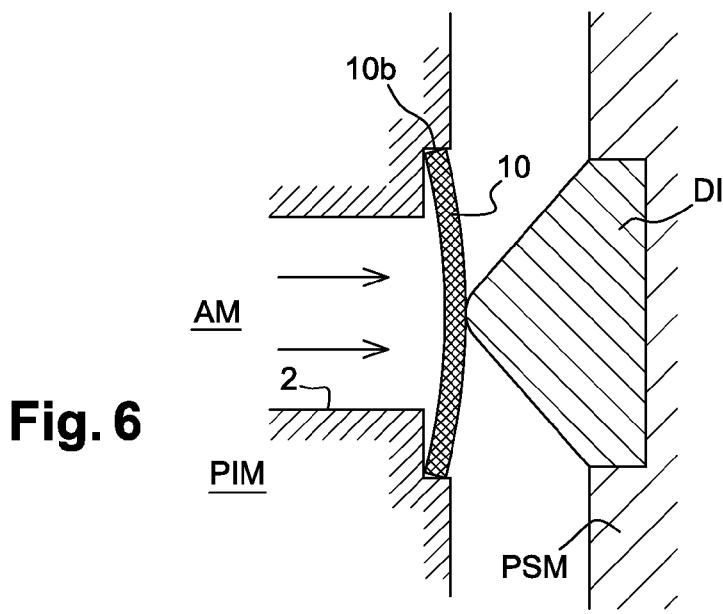

FILTER FOR USE IN THE CASTING OF ALUMINIUM, MAGNESIUM, COPPER ALLOY AND THE LIKE

CROSS-REFERENCE TO RELATED APPLICATIONS

The present application is a continuation of pending International patent application PCT/FR2009/050237 filed on Feb. 16, 2009 which designates the United States and claims priority from French patent application 0852147 filed on Apr. 1, 2008, the content of which is incorporated herein by reference.

FIELD OF THE INVENTION

The invention relates to the technical field of the production of parts made of aluminium, magnesium, copper alloy and the like, particularly with the fittings surrounding a gravity or low pressure foundry mould.

The invention relates more specifically to the filters used with foundry moulds located above the furnace accommodating alloys made of aluminium or the like and to the facilities accommodating them.

BACKGROUND OF THE INVENTION

A diagrammatic representation has been given of said fitting, according to the known prior art, in FIG. 1 of the drawings. A furnace (1) of any shape accommodates internally, in a large part of the volume thereof, a liquid fluid at high temperature, defined by an aluminium alloy or the like, while leaving free an internal volume (V1) of air. A vertical plunger device (2) is placed in the upper part of the furnace with, in outward projection, the mould (3) accommodating the part for production (4). The tube leads into the lower part of the mould, which is provided with a site accommodating a filter (5). A mould accommodating the part for production is placed above the furnace. The mould is coupled to the furnace via a plunger tube. Between the plunger tube and the mould is placed a filter so that the oxides can be removed. A pressure exerted on V1 brings the fluid up through the tube passing through the filter and then filling the cavity of the mould. These filters are made in practice in the form of a flat plate that may be, for example, in the shape of a disk, a square, a rectangle, or in a lattice pattern with a more or less significant mesh. The function of these filters, whether made of metal or fibre glass, is therefore to restrict and reduce, or even prevent, the transfer of aluminium oxides and the like from the bath into the mould for the production of the part to be obtained. These filters must be held in position in their accommodation seat at the feeder head of the part in order to provide an effective seal. The configuration of a prior art filter has been shown in FIG. 2.

Various problems are encountered however in practice, namely:

A problem of filter stability is encountered since they tend to come away from their seat under the effect of the pressures exerted by the movement of the fluids thereby causing losses of leak tightness and therefore a lack of control over the filtration of the oxidised particles. The movement of the fluid brings about turbulence that cause the filters to lift and the leak tightness to be eliminated or the filter to distort into a V-shape, that lets the unfiltered liquid alloy through. This situation has been shown diagrammatically in FIGS. 3 and 4. The reference AM shows the inflow of the metal through the tube, the reference PIM the lower part of the mould, the reference PSM, the upper part of the mould, and the reference DI the diffuser. The distortion of the filter has also been shown.

Another problem lies in the fact that when liquid metal is run onto prior art filters, they degas thereby releasing gas in the mould that may create oxides.

Furthermore, the filters are, to the knowledge of the applicant, installed in the mould bottom manually.

Another problem lies in the fact that the filters produced in accordance with the prior art are not recoverable. Prior art filters are too dense and they fall to the bottom of the liquid metal baths which makes it impossible to recycle the feeder head/filter unit.

The approach adopted by the applicant has therefore been to give consideration to a new design for filters that are able to provide an answer to the various problems raised. This consideration has revolved, on the one hand, around the filter structure itself and, on the other hand, around the configuration thereof.

The solution offered by the invention provides an answer to the various problems.

SUMMARY OF THE INVENTION

According to a first feature of the invention, the filter of the type produced in a fibreglass fabric is remarkable in that it includes an impregnation in an iron oxide enriched resin which confers a magnetization-based function and property upon it.

According to another feature, the bowl filter is remarkable in that it is convex in shape, the peripheral edge constituting the zone for the support and positioning of the filter in the accommodation seat of the foundry mould. Impregnating the fibre glass in the iron oxide enriched resin increases its rigidity and prevents it from distorting or turning over thereby ensuring even better positioning.

On the other hand, to make the filters convex, they are subjected to a high-temperature shaping operation so that the filters can be degassed at this stage avoiding this happening at the casting stage when off-gassing is most harmful.

These features and others will become clearer in the remainder of the specification.

BRIEF DESCRIPTION OF THE DRAWINGS

In order to fix the object of the invention it is shown non-restrictively in the figure drawings wherein:

FIGS. 3 and 4 show the distortion of the prior art filter in the zone of their seat at the mould bottom at feeder head level.

FIG. 5 shows a first implementation of the inventive filter in a convex shape according to a differentiated structure.

FIG. 6 is a diagrammatic view showing an inventive disk being installed in the seat provided at the mould bottom.

DETAILED DESCRIPTION OF THE INVENTION

Figure 1:
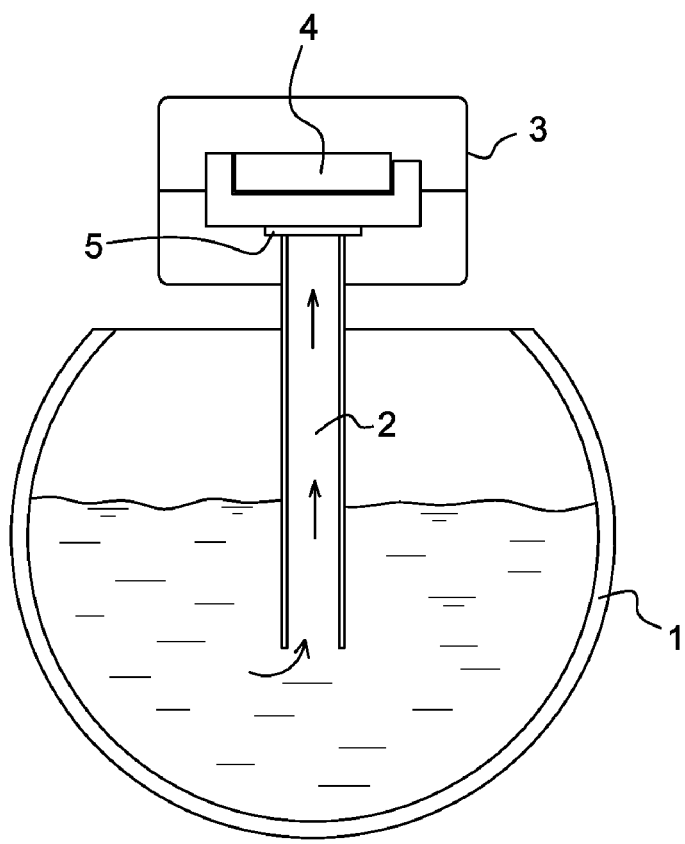
FIG. 1 shows in diagrammatic form the foundry facility including a filter.
Figure 2:
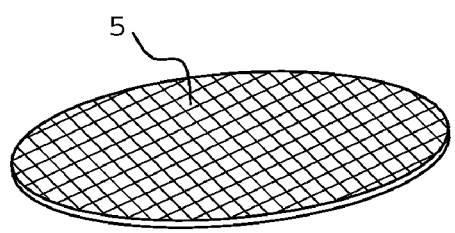
FIG. 2 is a view of a filter according to the prior art.

To give more concrete expression to the inventive object, it is now described non-restrictively, as shown in the figure drawings.

The filter according to the invention is given the reference number (10). It is made of a fibreglass fabric with a mesh adapted to specific needs to allow the filtration of the fluid found in the furnace constituting a fitting for the casting of aluminium, magnesium or copper alloy.

According to the invention, the filter, which is preferably convex in shape, includes, by immersion, an iron oxide enriched resin which confers magnetizable properties upon it. This resin is impregnated over all or part of the filter surface.

The filter according to the invention may have a flat shape but, in an optimized implementation, the shape is convex (10a) as shown in FIG. 5. Such an arrangement allows the filter to be positioned in the reverse position in its seat so that its peripheral edge (10b) presses against and is in contact with the bottom of the accommodating cavity. With reference to FIG. 6, the filter has its central convex part facing the diffuser built into the upper part of the present mould of the fitting so that it is substantially stopped thereagainst. The inflow of the metal (AM) and the stresses generated by the fluid play a part in stabilizing the filter (10) which is stuck and is unable to leave room and create gaps for the discharge of the fluid coming from the furnace. The filter therefore fulfils its filtration function in full. As an alternative, the filter has a raised peripheral edge.

The advantages are quite clear from the invention. To be stressed, from the outset, is the very great ease of handling and transportation of the filters on account of their metal structure properties and magnetizability. It is possible to have handling robots with built-in additional magnetization means for grabbing the filters and positioning them in their housing in the context of an appropriate automation process. The filter part is separated from the complementary part of the bottom placed on the handling robot in any appropriate manner.

Another advantage lies in the new, convex shape of the filter which provides better holding and stability in the accommodation seat and prevents any travel thereof that might generate zones through which fluid and therefore oxides might escape. Filtration is therefore maximum.

Another advantage lies in the fact that during the filter shaping operation which is conducted at high temperature, the filters are degassed under the effect of the temperature thereby preventing subsequent off-gassing in the moulds.

Another advantage lies in the fact that the filters, according to the invention, in the implementation described, float on the liquid metal, which allows the feeder head/filter unit to be recycled. The filters that float on the surface are removed with a skimmer as slag.

The invention therefore offers many advantages relative to the prior art.

What is claimed is:

1. A method of providing a filter for a foundry mold, the method comprising:
   providing a filter comprising a fiberglass fabric; and
   providing the filter with a magnetizable property by impregnating the filter with iron oxide;
   positioning the filter in a mold using at least one robot that magnetically holds the filter while positioning the filter.

2. The method of claim 1, wherein impregnating the filter with iron oxide comprises immersing the filter in an iron oxide enriched resin.

3. The method of claim 1, further comprising degassing the filter of oxide forming gases by heating it.

4. The method of claim 1, wherein the filter is convex.

5. The method of claim 1, further comprising:
   disposing the filter in a mold;
   wherein the mold comprises a lower mold part for the inflow of metal with a seat for accommodating the filter, and an upper mold part with a diffuser for diffusing the metal; and
   wherein the step of disposing the filter in the mold comprises disposing the filter in the seat of the lower mold part.

6. The method of claim 5, wherein the filter comprises a peripheral edge that contacts the seat of the lower mold part; and
   a convex part facing the diffuser.

7. The method of claim 6, wherein the convex part of the filter contacts the diffuser.

8. The method of claim 1, further comprising forming the filter into a convex shape by heating the filter, such that the filter is degassed of oxide forming gases while the convex shape is formed.

9. The method of claim 5, further comprising magnetically recovering the filter from the lower mold part.

10. The method of claim 1, further comprising forming the filter into a convex shape by heating the filter.

* * * * *